US012687901B2

(12) United States Patent
Liu et al.

(10) Patent No.: US 12,687,901 B2
(45) Date of Patent: Jul. 21, 2026

(54) HINGE DEVICE AND ELECTRONIC APPARATUS

(71) Applicant: LENOVO (SINGAPORE) PTE. LTD., Singapore (SG)

(72) Inventors: Yalu Liu, Yokohama (JP); Haonan Xiao, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 78 days.

(21) Appl. No.: 18/988,054

(22) Filed: Dec. 19, 2024

(65) Prior Publication Data

US 2025/0271909 A1 Aug. 28, 2025

(30) Foreign Application Priority Data

Feb. 22, 2024 (JP) .................................. 2024025703

(51) Int. Cl.
*G06F 1/16* (2006.01)
*F16C 11/04* (2006.01)

(52) U.S. Cl.
CPC ............ *G06F 1/1681* (2013.01); *F16C 11/04* (2013.01)

(58) Field of Classification Search
CPC ...... G06F 1/1681; F16C 11/04; F16C 11/103; F16F 13/02; H05K 5/0226; E05D 5/10; E05D 3/06; E05D 3/122; E05D 11/082
See application file for complete search history.

(56) References Cited

U.S. PATENT DOCUMENTS

| | | | | |
|---|---|---|---|---|
| 9,464,471 | B1 * | 10/2016 | Chen ...................... | G06F 1/1681 |
| 9,921,613 | B2 * | 3/2018 | Kuramochi ........... | G06F 1/1681 |
| 10,563,438 | B1 * | 2/2020 | Chen ......................... | E05D 5/10 |
| 11,359,425 | B2 * | 6/2022 | Chang ...................... | E05D 3/18 |
| 11,422,591 | B2 * | 8/2022 | Chen ................... | E05D 11/1064 |
| 2003/0126719 | A1 | 7/2003 | Chen | |
| 2010/0088853 | A1 | 4/2010 | Degner | |
| 2021/0156416 | A1 * | 5/2021 | Lin ....................... | G06F 1/1681 |

FOREIGN PATENT DOCUMENTS

CN        108087417 A * 5/2018 ............ F16C 11/045

OTHER PUBLICATIONS

EP search report in application No. 24219232.6-1218, dated Apr. 6, 2025.

* cited by examiner

*Primary Examiner* — Abhishek M Rathod
(74) *Attorney, Agent, or Firm* — SHIMOKAJI IP

(57) ABSTRACT

A hinge device includes a first shaft that is fixed to a display chassis, a second shaft that is fixed to a main body chassis, connecting plates to which the first shaft and the second shaft are rotatably fitted, a synchronization unit configured to synchronously rotate the first shaft and the second shaft in opposite directions with respect to the connecting plates, a first torque application unit configured to apply a frictional force to a peripheral surface of the first shaft by fitting the first shaft to the first torque application unit, and a second torque application unit configured to apply a frictional force to the second shaft in an axial direction.

4 Claims, 5 Drawing Sheets

HINGE DEVICE AND ELECTRONIC APPARATUS

BACKGROUND OF THE INVENTION

Field of the Invention

The present invention relates to a hinge device that connects a first chassis and a second chassis to be rotationally movable, and an electronic apparatus in which the first chassis and the second chassis are connected in a rotationally movable manner by the hinge device.

Description of the Related Art

In an electronic apparatus such as a laptop PC, a configuration is used in which two chassis are connected to each other relatively in a rotationally movable manner by a hinge device. This type of electronic apparatus needs to be able to hold the chassis in a stable manner at a desired angular posture while ensuring a smooth rotational movement operation between the chassis. Therefore, the hinge device needs to be able to generate appropriate rotational torque. As a mechanism that generates the rotational torque, for example, there is a configuration in which a leaf spring is interposed between a bracket and a shaft to generate sliding resistance (see Japanese Unexamined Patent Application Publication No. 2019-190518).

SUMMARY OF THE INVENTION

The configuration described in Japanese Unexamined Patent Application Publication No. 2019-190518 requires a larger diameter to generate sufficient rotational torque, which is not desirable for further thinning of the electronic apparatus.

In addition, as another torque generation mechanism, there is a mechanism in which one end of a bracket fixed to a chassis is curled and wound around a shaft of a hinge to generate sliding resistance. However, in this configuration, in order to generate sufficient rotational torque, it is necessary to provide the curled portion to be long in the axial direction and to make the straightness of the shaft portion corresponding thereto high, which makes manufacturing difficult. In addition, in this configuration, the curled portion is elastic, and vibration is likely to occur between the two chassis.

The present invention has been made in view of the above-described problems, and an object of the present invention is to provide a hinge device and an electronic apparatus that can generate a sufficient torque even with a small diameter and suppress vibration between chassis.

In order to achieve the object and solve the above-described problem, according to an embodiment of the present invention, there is provided a hinge device that connects a first chassis and a second chassis to each other in a rotationally movable manner, the hinge device including a first shaft that is fixed to the first chassis, a second shaft that is fixed to the second chassis, a connecting member to which the first shaft and the second shaft are rotatably fitted, a synchronization unit configured to synchronously rotate the first shaft and the second shaft in opposite directions with respect to each other with reference to the connecting member, a first torque application unit configured to apply a frictional force to a peripheral surface of the first shaft by fitting the first shaft to the first torque application unit, and a second torque application unit configured to apply a frictional force to the second shaft in an axial direction.

In addition, the electronic apparatus according to the embodiment of the present invention is an electronic apparatus in which a first chassis and a second chassis are connected to each other in a rotationally movable manner by a hinge device, in which the hinge device includes a first shaft that is fixed to the first chassis, a second shaft that is fixed to the second chassis, a connecting member to which the first shaft and the second shaft are rotatably fitted, a synchronization unit configured to synchronously rotate the first shaft and the second shaft in opposite directions with respect to each other with reference to the connecting member, a first torque application unit configured to apply a frictional force to a peripheral surface of the first shaft by fitting the first shaft to the first torque application unit, and a second torque application unit configured to apply a frictional force to the second shaft in an axial direction.

According to the above-described aspect of the present invention, since the first shaft and the second shaft are shared by the first torque application unit and the second torque application unit to apply rotational torque, sufficient torque can be generated. In addition, the first torque application unit does not need to have a large diameter because the first torque application unit covers the peripheral surface, and the second torque application unit does not need to be large in the radial direction according to the amount of torque to be shared, and a small diameter is sufficient, resulting in a hinge device having a smaller diameter. The second torque application unit hardly expands and contracts in the circumferential direction, and vibration is unlikely to occur between the chassis.

BRIEF DESCRIPTION OF THE DRAWINGS

FIGS. 2A to 2E are partially enlarged schematic side views of the electronic apparatus, in which FIG. 2A is a state in which an opening and closing angle between a main body chassis and a display chassis is 0 degrees, FIG. 2B is a state in which the opening and closing angle is 90 degrees, FIG. 2C is a state in which the opening and closing angle is 170 degrees, FIG. 2D is a state in which the opening and closing angle is 270 degrees, and FIG. 2E is a state in which the opening and closing angle is 360 degrees.

DETAILED DESCRIPTION OF THE INVENTION

Hereinafter, an embodiment of a hinge device and an electronic apparatus according to the present invention will be described in detail with reference to drawings. The present invention is not limited to this embodiment. An embodiment of the present invention is a hinge device 10 and an electronic apparatus 12 including the hinge device 10.

Figure 1:
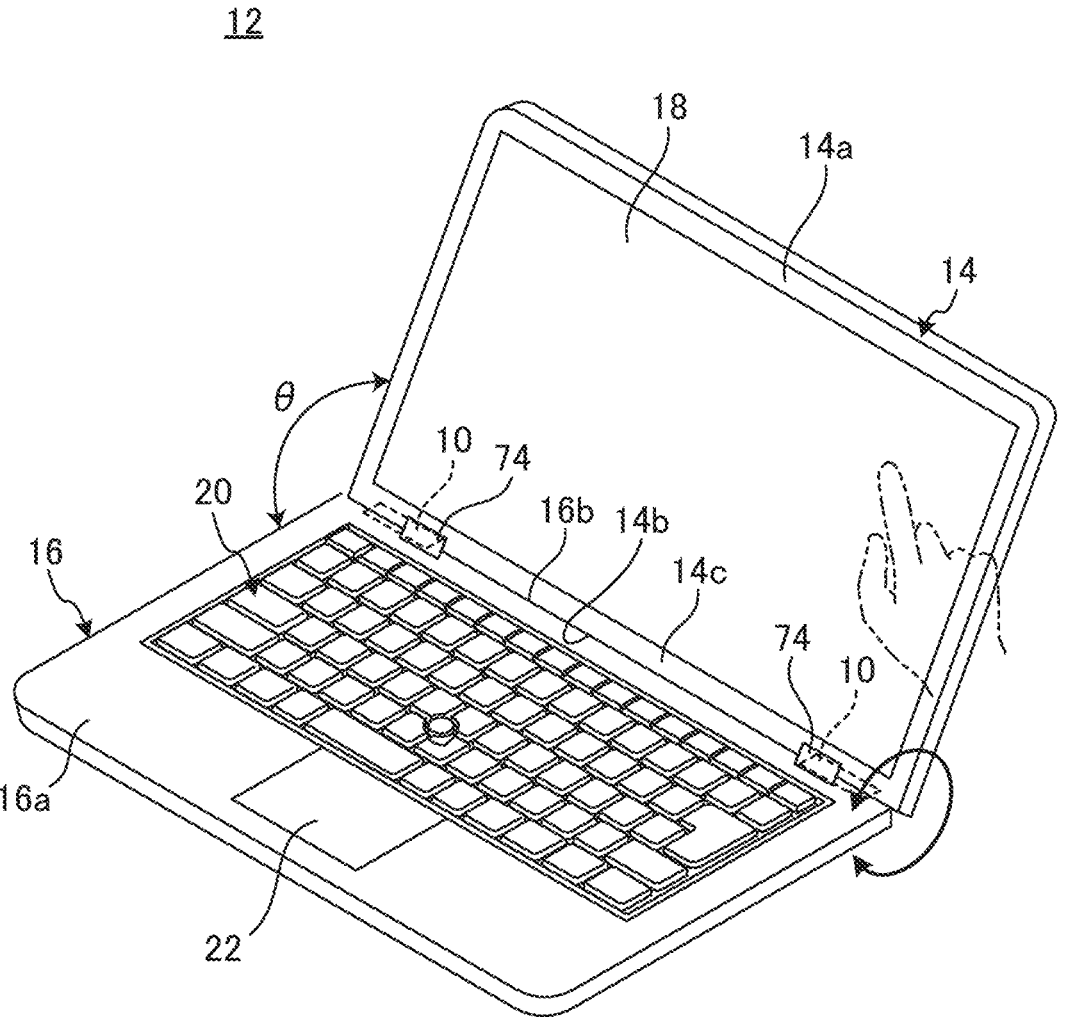
FIG. 1 is a schematic plan view of an electronic apparatus including a hinge device according to an embodiment of the present invention as viewed from above.
Figures 2A, 2B, 2C, 2D, 2E:
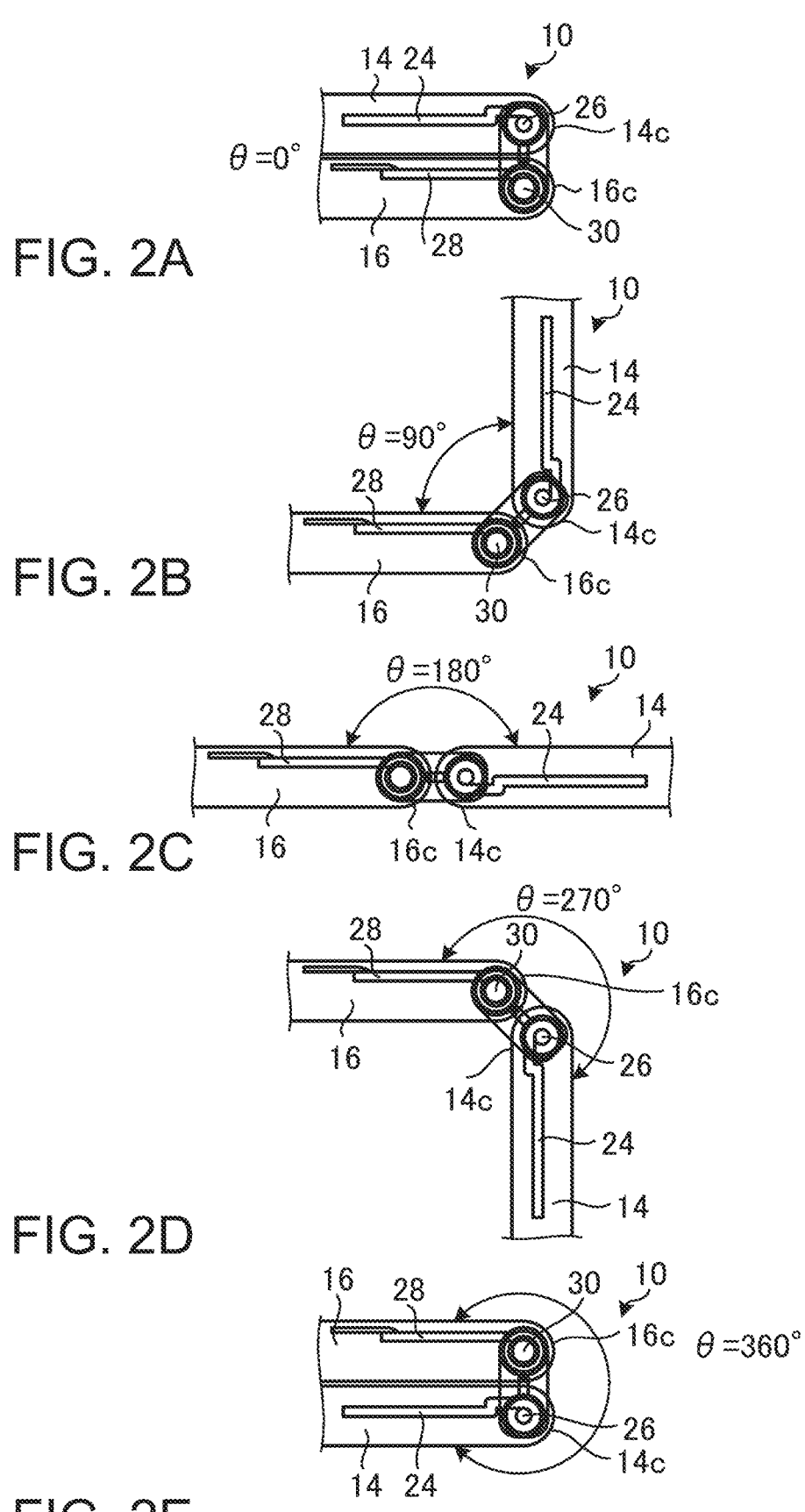

FIG. 1 is a perspective view of the electronic apparatus 12 including the hinge devices 10 and 10, and illustrates a usage form of a laptop PC in which a display chassis (first chassis)

14 is opened from a main body chassis (second chassis) 16 by the hinge devices 10 and 10. FIGS. 2A to 2E are partially enlarged schematic side views at each angular position in a case in which the display chassis 14 of the electronic apparatus 12 illustrated in FIG. 1 is rotationally moved with respect to the main body chassis 16. A closed state (refer to FIG. 2A) in which the main body chassis 16 and the display chassis 14 are at positions at which a surface of the display 18 (refer to FIG. 1) and a surface of a keyboard 20 (refer to FIG. 1) face each other is referred to as an opening and closing angle of 0 degrees. A state (refer to FIG. 2E) in which the main body chassis 16 and the display chassis 14 are rotationally moved relatively so that the surface of the display 18 and the surface of the keyboard 20 are open to a position at which the surface of the display 18 and the surface of the keyboard 20 face outward is referred to as an opening and closing angle of 360 degrees. Hereinafter, an opening and closing angle of the display chassis 14 with respect to the main body chassis 16 is denoted by θ.

The mode of the electronic apparatus 12 according to the present embodiment is automatically switched to a closed mode, a laptop mode, a stand mode, a tent mode, and a tablet mode based on the opening and closing angle θ of the display chassis 14 with respect to the main body chassis 16, and the display/non-display of the display 18, the display orientation of the display 18, and the validity/invalidity of the keyboard 20 and a touch pad 22 are switched depending on the mode. The electronic apparatus according to the present invention may be a foldable portable phone, a smartphone, a portable game machine, or the like, in addition to a laptop PC.

As illustrated in FIGS. 1 and 2, the electronic apparatus 12 is configured such that an end portion 14b of the display chassis 14 having the display 18 on a surface 14a thereof and an end portion 16b of the main body chassis 16 having the keyboard 20 on a surface 16a thereof are connected to each other in a rotationally movable manner by a pair of left and right hinge devices 10 and 10.

The display chassis 14 is configured to be thinner than the main body chassis 16 and to have a flat plate shape. The display chassis 14 is connected to the main body chassis 16 by the hinge devices 10 and 10 provided at the end portion 16b of the main body chassis 16. The display 18 is configured by a touch panel type liquid crystal display device and can be operated by a hand or a pen as illustrated by a virtual line, and is surrounded by a frame body 14c.

The main body chassis 16 is configured in a flat box shape. The main body chassis 16 is connected to the display chassis 14 by the hinge devices 10 and 10 provided at the end portion 16b thereof. An input unit such as the keyboard 20 and the touch pad 22 is provided on the surface 16a of the main body chassis 16, and various electronic components such as a substrate, a computing device, and a memory are provided inside the main body chassis 16.

As illustrated in FIGS. 2A to 2E, the hinge devices 10 and 10 allow rotational movement of the display chassis 14 from a position of 0 degrees to a position of 360 degrees by a biaxial structure. The rotational movement range may be 360 degrees or less depending on the design conditions.

Figure 3:
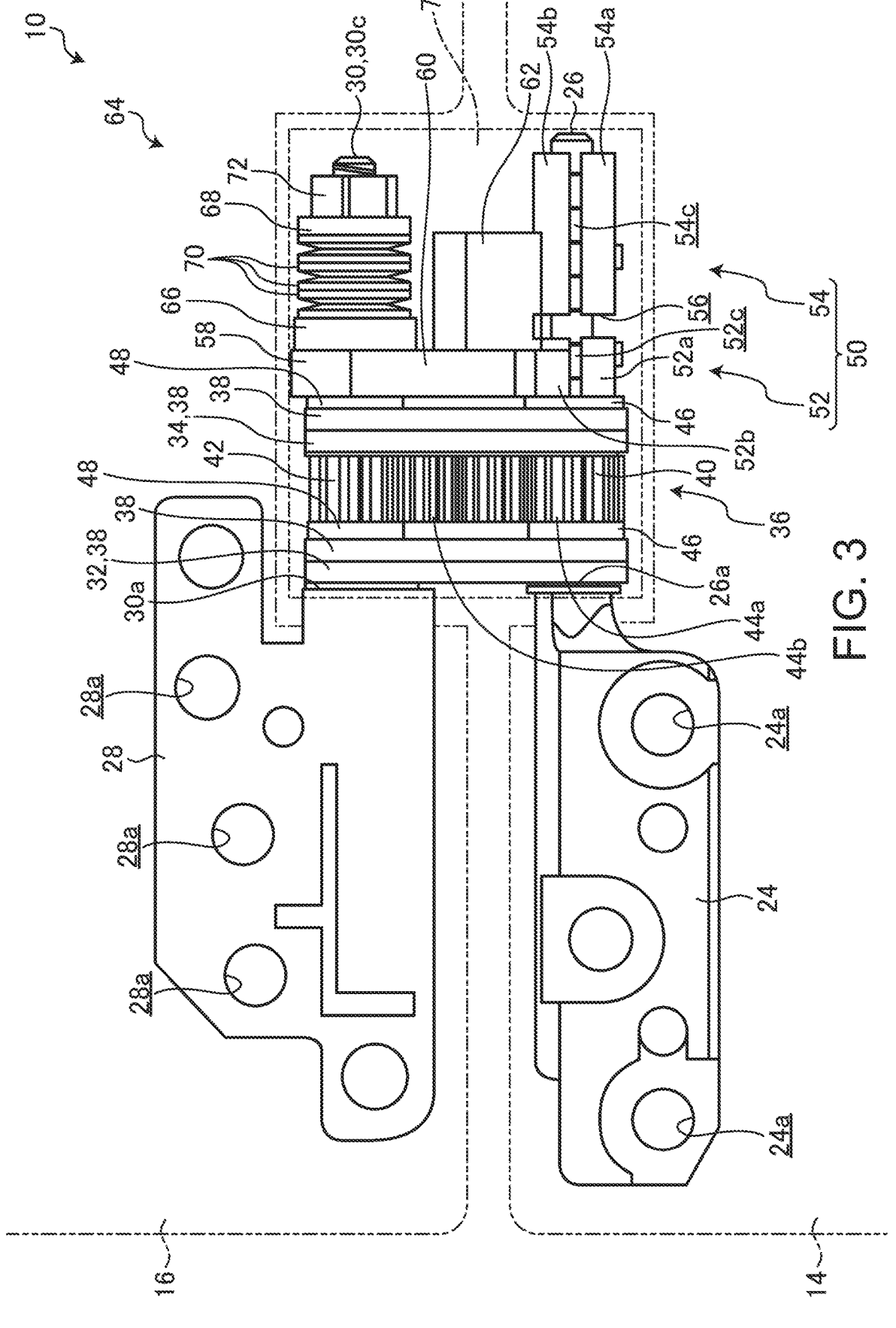
FIG. 3 is a plan view of the hinge device and a peripheral portion thereof.
Figure 4:
FIG. 4 is an exploded perspective view of the hinge device.

Next, a specific configuration example of the hinge device 10 will be described. FIG. 3 is a plan view of the hinge device 10 and a peripheral portion thereof. FIG. 4 is an exploded perspective view of the hinge device 10. Since the left and right hinge devices 10 have the same configuration except that the left and right hinge devices 10 are bilaterally symmetric, one hinge device 10 will be described below, and the other hinge device 10 will not be described. The left-right orientation of the hinge device 10 will be described with reference to FIGS. 3 and 4.

As illustrated in FIGS. 3 and 4, the hinge device 10 is a biaxial type that is configured based on a first shaft 26 that protrudes integrally in the right direction with a first bracket 24 fixed to the display chassis 14, and a second shaft 30 that protrudes integrally in the right direction with second bracket 28 fixed to the main body chassis 16. The first shaft 26 and the second shaft 30 have a solid structure, have the same diameter, and are parallel to each other. The first shaft 26 is slightly longer than the second shaft 30. The hinge device 10 is fixed to the display chassis 14 and the main body chassis 16 by screwing screws into a plurality of screw holes 24a and 28a formed in the brackets 24 and 28, and connects the display chassis 14 and the main body chassis 16 to each other in a rotationally movable manner. The hinge device 10 and the chassis may be fixed by applying serration or the like depending on the load condition or the like.

A step 26a that acts as a flange is formed at a boundary portion between the bracket 24 and the first shaft 26. A plurality of annular muscles 26c for easily receiving a frictional force are formed on a right half of the first shaft 26. Two opposing D-cuts 26b are formed on a left half of the first shaft 26. A step 30a that acts as a flange is formed at a boundary portion between the bracket 28 and the second shaft 30. A male screw portion 30c is formed at a distal end of the second shaft 30, and two opposing D-cuts 30b are formed at a portion excluding the male screw portion 30c.

The hinge device 10 further includes a first connecting plate (connecting member) 32 and a second connecting plate (connecting member) 34 to which the first shaft 26 and the second shaft 30 are rotatably fitted, and a synchronization unit 36 that synchronously rotates the first shaft 26 and the second shaft 30 in opposite directions with respect to the connecting plates 32 and 34.

Each of the connecting plates 32 and 34 has a high strength because two plates 38 are laminated. In a case in which the plate 38 is thick, one plate may be used. The plate 38 is an oval-shaped plate piece of which both ends are circular arcs, a first shaft hole 38a through which the first shaft 26 passes is formed in the vicinity of one end, and a second shaft hole 38b through which the second shaft 30 passes is formed in the vicinity of the other end. The first shaft hole 38a and the second shaft hole 38b have the same diameter. In the plate 38, a portion around the first shaft hole 38a is thicker than a portion around the second shaft hole 38b. Two gear holes 38c are formed side by side between the first shaft hole 38a and the second shaft hole 38b in the plate 38.

The synchronization unit 36 is provided between the first connecting plate 32 and the second connecting plate 34, and includes a first shaft gear 40 that is fitted to the first shaft 26 so as not to be rotated by the D-cut 28b, a second shaft gear 42 that is fitted to the second shaft 30 so as not to be rotated by the D-cut 30b, and two relay gears 44a and 44b that are provided between the first shaft gear 40 and the second shaft gear 42. Both ends of the relay gears 44a and 44b are pivotally supported by the gear holes 38c of the plate 38. The shaft gears 40 and 42 have the same number of teeth. The relay gears 44a and 44b have the same number of teeth. The first shaft gear 40 meshes with the relay gear 44a, the relay gear 44a meshes with the relay gear 44b, and the relay gear 44b meshes with the second shaft gear 42. As a result, the first shaft 26 and the second shaft 30 rotate synchronously in opposite directions.

A washer 46 is fitted between the first connecting plate 32 and the first shaft gear 40 and at a portion of the first shaft 26 that abuts onto the right side surface of the second connecting plate 34. A fixed washer 48 is fitted between the first connecting plate 32 and the second shaft gear 42 and at a portion of the second shaft 30 that abuts onto the right side surface of the second connecting plate 34. The fixed washer 48 is fitted to the second shaft 30 so as not to be rotated by the D-cut 30b. The washer 46 and the fixed washer 48 have the same thickness.

The first shaft 26 is provided with a first torque application unit 50. The first torque application unit 50 applies a frictional force to the peripheral surface of the first shaft 26 by fitting the first shaft 26 to the first torque application unit 50.

The first torque application unit 50 has a first band 52 and a second band 54 having different axial lengths. The first band 52 is on the left side, the second band 54 is on the right side, and a narrow gap 56 is present between the two bands. In the present example, the axial length of the second band 54 is about twice the length of the first band 52. The axial length of the first band 52 is approximately equal to the diameter of the first shaft 26.

The first band 52 has a cross-sectional C-shape, including a first arc portion 52a and a second arc portion 52b, and a slit 52c is formed between the first arc portion 52a and the second arc portion 52b. Similarly, the second band 54 has a cross-sectional C-shape, including a first arc portion 54a and a second arc portion 54b, and a slit 54c is formed between the first arc portion 54a and the second arc portion 54b. The first arc portions 52a and 54a have larger arc angles than the second arc portions 52b and 54b. Since the slits 52c and 54c are provided, a difference in torque generated between the opening operation and the closing operation of the chassis 14 and 16 occurs, and the opening operation torque and the closing operation torque can be set to be different from each other.

The first torque application unit 50 is integrated with a tube body 58 that is fitted to the second shaft 30. The tube body 58 has a diameter, a thickness, and an axial position that are substantially equal to those of the first band 52, and is connected to the first band 52 by a connecting portion 60. The connecting portion 60 extends in the direction of the first band 52 with the same width as the diameter of the tube body 58, but the portion closest to the connection with the first band 52 is slightly narrower. The peripheral surface of the second band 54 and the right side surface of the connecting portion 60 are connected to each other by a block 62. However, the block 62 is shorter than the second band 54 in the axial direction, and in the present example, a range of about ½ of the second band 54 on the left side is connected to the block 62. A portion of the block 62 facing the second shaft 30 is arc-shaped.

The bands 52 and 54 are not limited to the C-shape and may have any shape as long as a frictional force can be applied to the first shaft 26 to be fitted, and may be, for example, a columnar shape. The bands 52 and 54 may be formed by curling a part of the connecting portion 60 and the block 62 in an arc shape, may be formed by die molding, or may be formed by CNC machining or the like.

The second shaft 30 is provided with a second torque application unit 64. The second torque application unit 64 applies a frictional force to the second shaft 30 in the axial direction. The second torque application unit 64 includes fixed washers 66 and 68, a plurality of discs (elastic members) 70, and a nut 72, which are fitted to or screwed to the second shaft 30. In addition, the above-described step 30a and the fixed washer 48 are also a part of the second torque application unit 64.

The fixed washer 66 is provided at a position at which the fixed washer 66 abuts onto the right surface of the tube body 58, and is fitted to the second shaft 30 so as not to be rotated by the D-cut 30b. The fixed washer 66 has a thickness that is about twice the thickness of the fixed washer 48. The disc 70 is a leaf spring formed of a dish-shaped metal plate, and in the present example, six discs 70 are laminated between the fixed washer 66 and the fixed washer 68.

The fixed washer 68 is provided in the vicinity of an end portion of the second shaft 30 and is fitted to the second shaft 30 so as not to be rotated by the D-cut 30b. The nut 72 is screwed to the male screw portion 30c of the right end portion of the second shaft 26, and the first connecting plate 32, the fixed washer 48, the second shaft gear 42, the second connecting plate 34, the fixed washer 48, the tube body 58, the fixed washer 66, the disc 70, and the fixed washer 68 are tightened with an appropriate force with respect to the right end of the step 30a. The nut 72 may be subjected to a locking treatment.

The second torque application unit 64 generates a frictional force in the axial direction with respect to the second shaft 30 by causing the disc 70 to be elastically compressed by generating an axial force on the second shaft 30 by tightening the nut 72. Then, rotational torque is applied to the second shaft 30 by frictional resistance on the sliding surfaces of the step 30a, the connecting plates 32 and 34, the fixed washers 48, 66, and 68, the tube body 58, and the disc 70. In the present example, the frictional force is dispersed by providing a large number of sliding surfaces, which is suitable, but the number of sliding surfaces may be increased or decreased depending on the conditions. The number of sliding surfaces can be increased or decreased, for example, by increasing or decreasing the number of the discs 70. In the hinge device 10, portions other than the brackets 24 and 28 are covered with a cover 74.

Figure 5:
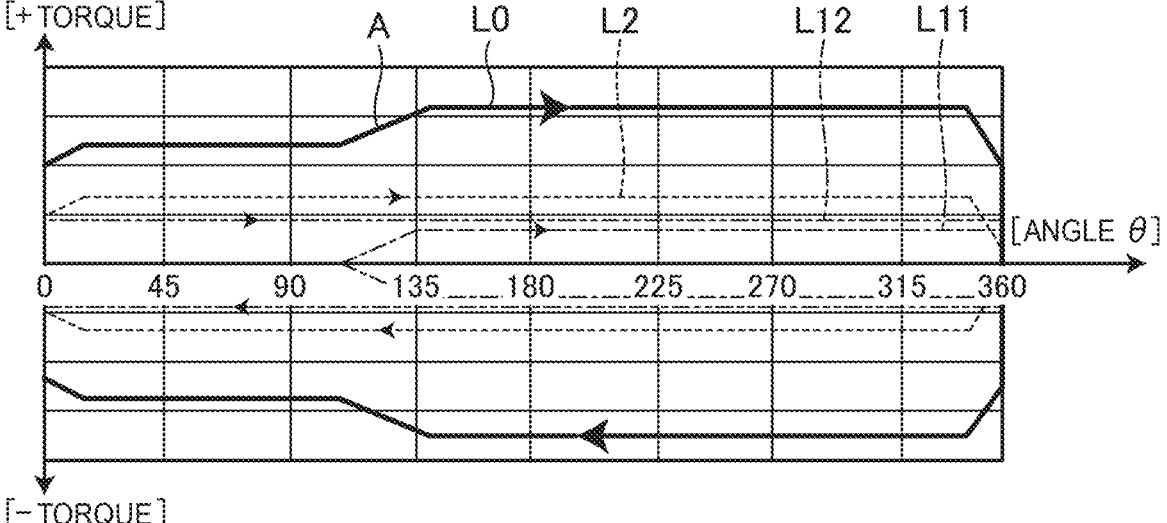
FIG. 5 is a graph illustrating a torque generated by the hinge device.

FIG. 5 is a graph illustrating a torque generated by the hinge device 10. In the graph, a one-dot chain line L11 indicates the torque generated by the first band 52 of the first torque application unit 50, a two-dot chain line L12 indicates the torque generated by the second band 54 of the first torque application unit 50, a broken line L2 indicates the torque generated by the second torque application unit 64, and a solid line L0 indicates the total torque generated by the first torque application unit 50 and the second torque application unit 64. The horizontal axis indicates the angle θ, and the upper side of the horizontal axis indicates the +torque generated during the opening operation, and the lower side indicates the—torque generated during the closing operation.

The first band 52, the second band 54, the second torque application unit 64, and the total torque thereof have different polarities of torque generated during the opening operation and the closing operation. Here, the +torque generated at the time of the opening operation will be described as an example. The torque generated by the first band 52 indicated by the line L11 is 0 from about 0 to 110 degrees, increases from about 110 to 140 degrees, and then remains constant until 360 degrees. The first band 52 and the first shaft 26 have different cross-sectional shapes, and can generate different torques depending on the angle θ due to the actions of the position and the width of the slit 52c. In the example of FIG. 5, the absolute values of the torques generated during the opening operation and the closing operation are equal to each other, but as described above, the opening operation torque and the closing operation torque can be set to be different from each other according to the required specifications.

The torque generated by the second band 54, indicated by the line L12 generates a constant torque in a range of 0 to 360 degrees. The torque due to the second band 54, which is slightly long in the axial direction, is slightly larger than the maximum torque of the short first band 52.

The auto-lock function is implemented in which the torque generated by the second torque application unit 64 indicated by the line L2 is slightly increased to about 0 to 10 degrees, a constant torque is generated to about 10 to 350 degrees, and the torque is rapidly decreased at 350 to 360 degrees. As a result, it is possible to prevent the inability to rotationally move to 360 degrees due to residual torque when used as a tablet. The maximum torque generated by the second torque application unit 64 is slightly larger than the torque generated by the second band 54. In the present example, the maximum torque generated by the second torque application unit 64 is about twice the maximum torque generated by the first band 52.

The total torque indicated by the line L0 is small near 0 degrees during the opening operation, making it easy to start the operation with one hand, and the torque decreases near 0 degrees during the closing operation, and thus the residual torque is small and it is possible to reliably achieve the 0-degree state.

The electronic apparatus 12 is in a state in which the angle θ is usually used in a range of about 120 to 130 degrees (see also FIG. 1). This position is indicated by a reference numeral A. The total torque is maintained at a relatively small torque from 10 degrees to the position of the reference numeral A, and thus the operation can be easily performed even with one hand. In addition, since the total torque increases at the position of the reference numeral A, it is easier to maintain the angle θ. In particular, the display 18 is difficult to tilt backward and stable even when touched with a hand or pen for touch panel operation. In addition, the first torque application unit 50 can and slightly expand contract in the circumferential direction due to elasticity of the bands 52 and 54, but the second torque application unit 64 hardly expands and contracts in the circumferential direction, and vibration is unlikely to occur between the display chassis 14 and the main body chassis 16, and especially, in the touch panel type electronic apparatus 12, the display 18 is stable and easy to operate by touch.

The total torque indicated by the line L0 can be reliably set to the 360-degree state because the torque decreases near 360 degrees during the opening operation, and the torque is small during the closing operation, and thus it is easy to start the operation. The total torque is substantially equal at 0 degrees and 360 degrees.

In the hinge device 10 and the electronic apparatus 12 according to the present embodiment, since the rotational torque is applied by being shared between the first torque application unit 50 and the second torque application unit 64, the torque generated by each unit is only half, and when the torque is added together, sufficient torque can be generated. However, the torque sharing amounts between the first torque application unit 50 and the second torque application unit 64 are not limited to being equal, and may differ to some extent.

Since the bands 52 and 54 cover the peripheral surface of the first torque application unit 50, the first torque application unit 50 does not need to have a large diameter. In addition, since only half of the torque is shared, there is no need to lengthen the shaft in the axial direction, and the straightness of the first shaft 26 portion to be fitted only requires a relatively low degree of precision, thereby making manufacturing easy.

The second torque application unit 64 does not need to be larger in the radial direction because only half of the torque is shared, and a smaller diameter is sufficient. Since the hinge device 10 requires only a small diameter for the first torque application unit 50, this contributes to making the display chassis 14 thinner and the frame body 14*c* narrower. In addition, the second torque application unit 64 has a small diameter, which contributes to making the main body chassis 16 thinner. Since the hinge device 10 is a biaxial type, and the torque application unit 50 provided on the first shaft 26 and the second torque application unit 64 provided on the second shaft 30 are arranged in parallel, the left-right length in FIGS. 3 and 4 can be reduced.

The present invention is not limited to the above-described embodiment, and there is no doubt that the present invention can be freely changed without departing from the gist of the present invention.

The invention claimed is:

1. A hinge device that connects a first chassis and a second chassis to each other in a rotationally movable manner, the hinge device comprising:

a first shaft that is fixed to the first chassis;

a second shaft that is fixed to the second chassis;

a connecting member to which the first shaft and the second shaft are rotatably fitted;

a synchronization unit configured to synchronously rotate the first shaft and the second shaft in opposite directions with reference to the connecting member;

a first torque application unit configured to apply a first frictional force to a peripheral surface of the first shaft by fitting the first shaft to the first torque application unit; and a second torque application unit configured to apply a second frictional force to the second shaft in an axial direction, where the first torque application unit has a first band and a second band having different axial lengths, the first band has a cross-sectional C-shape, including a first arc portion and a second arc portion, and a slit is formed between the first arc portion and the second arc portion, and the second band has a cross-sectional C-shape, including a first arc portion and a second arc portion, and a slit is formed between the first arc portion and the second arc portion, the first arc portions and have larger arc angles than the second arc portions.

2. The hinge device according to claim 1, wherein the second torque application unit includes:

a flange on the second shaft, and a nut screwed to a screw portion of the second shaft and tightened to the flange via an elastic member.

3. The hinge device according to claim 1, wherein the first torque application unit is integrated with a tube body fitted to the second shaft.

4. An electronic apparatus in which a first chassis and a second chassis are connected to each other in a rotationally movable manner by a hinge device, wherein the hinge device includes a first shaft that is fixed to the first chassis, a second shaft that is fixed to the second chassis, a connecting member to which the first shaft and the second shaft are rotatably fitted, a synchronization unit configured to synchronously rotate the first shaft and the second shaft in opposite directions with reference to the connecting member, a first torque application unit configured to apply a first frictional force to a peripheral surface of the first shaft by fitting the first shaft to the first torque application unit, and a second torque application unit configured to apply a second frictional force to the second shaft in an axial direction, where the first torque application unit has a first band and a second band having different axial lengths, the first band has a cross-sectional C-shape, including a first arc portion and a second arc portion, and a slit is formed between the first arc portion and the second arc portion, and the second band has a cross-sectional C-shape, including a first arc portion and a second arc portion, and a slit is formed between the first arc portion and the second arc portion, the first arc portions and have larger arc angles than the second arc portions.

* * * * *